(12) United States Patent
Chen

(10) Patent No.: US 11,041,604 B2
(45) Date of Patent: Jun. 22, 2021

(54) VEHICLE CARGO LAMP

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 16/548,152

(22) Filed: Aug. 22, 2019

(65) Prior Publication Data

US 2021/0054987 A1  Feb. 25, 2021

(51) Int. Cl.

| F21V 5/04 | (2006.01) |
|---|---|
| B60Q 3/30 | (2017.01) |
| B60Q 3/60 | (2017.01) |
| F21W 107/10 | (2018.01) |
| F21W 106/00 | (2018.01) |

(52) U.S. Cl.
CPC ............... *F21V 5/045* (2013.01); *B60Q 3/30* (2017.02); *B60Q 3/60* (2017.02); *F21W 2106/00* (2018.01); *F21W 2107/10* (2018.01)

(58) Field of Classification Search
CPC .... B60Q 3/30; B60Q 3/60; F21V 5/04; F21V 5/045; F21W 2107/10; F21W 2106/00; F21Y 2115/10
See application file for complete search history.

(56) References Cited

U.S. PATENT DOCUMENTS

| 2,146,701 | A | * | 2/1939 | Peterson | .................. | B60Q 3/30 |
|---|---|---|---|---|---|---|
| | | | | | | 362/496 |
| 6,352,359 | B1 | | 3/2002 | Shie et al. | | |
| 6,414,801 | B1 | | 7/2002 | Roller | | |
| 8,011,803 | B2 | | 9/2011 | Cheung et al. | | |
| 2006/0291224 | A1 | * | 12/2006 | England | .................. | B60Q 3/59 |
| | | | | | | 362/490 |
| 2010/0165636 | A1 | * | 7/2010 | Chen | ..................... | F21V 7/0091 |
| | | | | | | 362/308 |
| 2017/0313244 | A1 | * | 11/2017 | Luciew | .................... | B60Q 3/30 |
| 2018/0304805 | A1 | * | 10/2018 | Villacres Mesias | ... | B60Q 3/217 |
| 2019/0118706 | A1 | | 4/2019 | Chen et al. | | |
| 2019/0128503 | A1 | * | 5/2019 | Irgang | ..................... | F21V 17/06 |

FOREIGN PATENT DOCUMENTS

| CA | | 2477643 | | 9/2003 | | |
|---|---|---|---|---|---|---|
| CN | | 106224867 | A * | 12/2016 | ............. | B60Q 3/217 |
| EP | | 2353936 | A1 * | 8/2011 | ............... | B60Q 3/30 |
| WO | WO-2018047582 | A1 * | 3/2018 | ............... | B60Q 3/74 |

* cited by examiner

*Primary Examiner* — Erin Kryukova
(74) *Attorney, Agent, or Firm* — David Coppiellie; Price Heneveld LLP

(57) ABSTRACT

A vehicle includes a vehicle body that defines a cargo space. The cargo space includes a cargo floor. A trim member is disposed on the vehicle body within the cargo space. The trim member defines an opening. The housing is disposed within the opening. A light source is disposed on the housing. A first lens is disposed adjacent to the light source. The first lens defines a first optic. A second lens is spaced-apart from the first lens. The second lens defines a second optic. The light source is configured to emit light through the first lens and the second lens into the cargo space.

16 Claims, 6 Drawing Sheets

VEHICLE CARGO LAMP

FIELD OF THE DISCLOSURE

The present disclosure generally relates to a cargo lamp. More specifically, the present disclosure relates to a cargo lamp for a vehicle.

BACKGROUND OF THE DISCLOSURE

Lamp assemblies are commonly employed in vehicles to provide various lighting functions. Typically, lamp assemblies may be disposed on the interior and exterior of the vehicle. When disposed in the interior of the vehicle, the lamp assemblies function to illuminate specific locations of the vehicle.

SUMMARY OF THE DISCLOSURE

According to at least one aspect of the present disclosure, a vehicle includes a vehicle body that defines a cargo space. The cargo space includes a cargo floor. A trim member is disposed on the vehicle body within the cargo space. The trim member defines an opening. The housing is disposed within the opening. A light source is disposed on the housing. A first lens is disposed adjacent to the light source. The first lens defines a first optic. A second lens is spaced-apart from the first lens. The second lens defines a second optic. The light source is configured to emit light through the first lens and the second lens into the cargo space.

According to another aspect of the present disclosure, a vehicle cargo lamp assembly includes a circuit board and first and second light sources disposed on the circuit board and spaced-apart from one another. A first inner lens is disposed proximate the first light source. The first inner lens defines a first inner optic and a second inner optic. A second inner lens is disposed proximate the second light source. The second inner lens defines the first inner optic and the second inner optic. An outer lens is disposed proximate the first and second inner lenses. The outer lens defines an outer optic.

According to another aspect of the present disclosure, a cargo lamp assembly includes a circuit board and a light source disposed on the circuit board. An inner lens is disposed adjacent to the light source. The inner lens defines a first inner optic and a second inner optic. An outer lens is disposed adjacent to the inner lens. The outer lens defines an outer optic. The light source emits light through the first and second inner lenses and the outer lens when the light source is activated.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
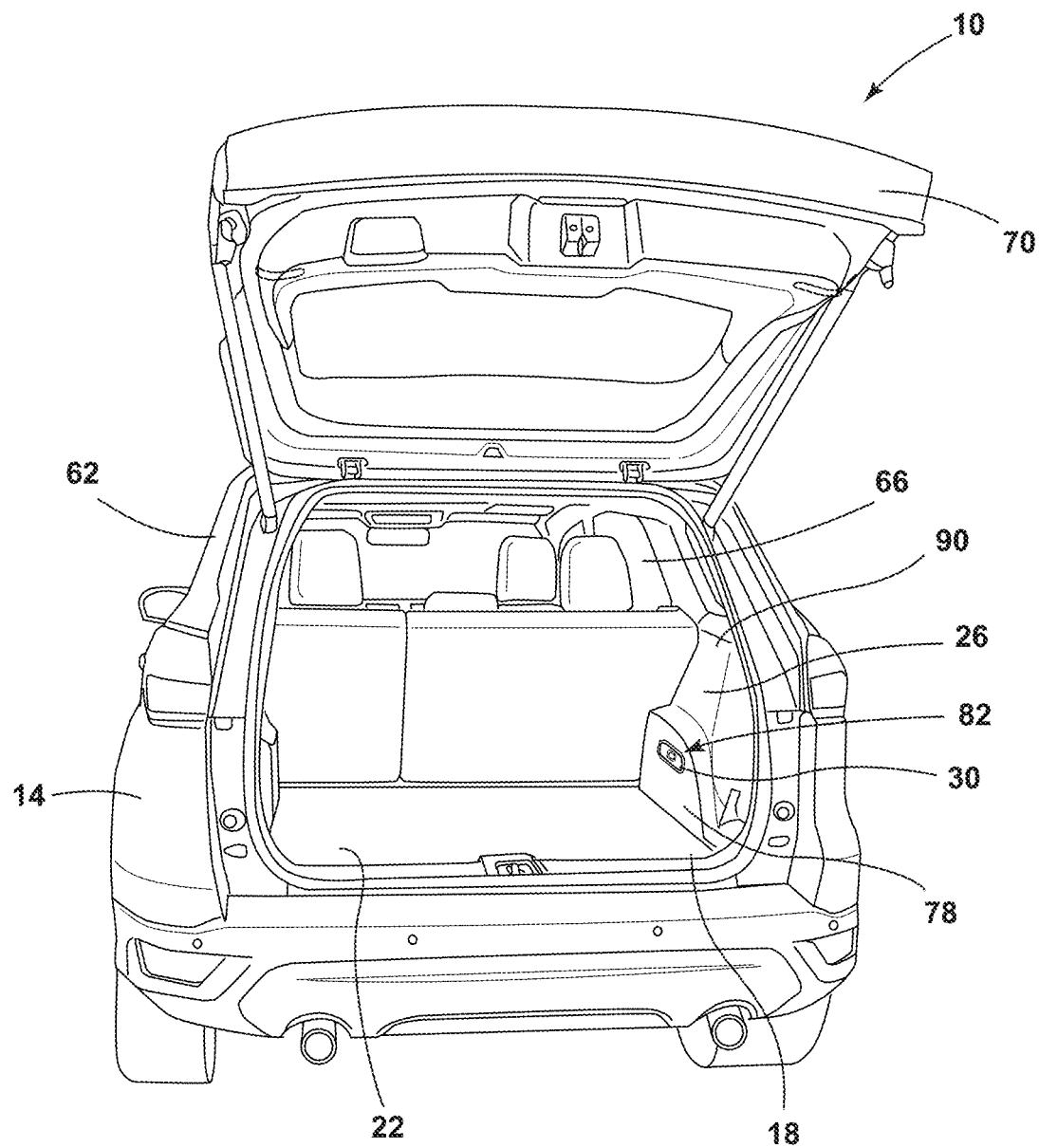
FIG. 1 is a rear perspective view of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-9, reference numeral 10 generally refers to a vehicle that includes a vehicle body 14 that defines a cargo space 18. The cargo space 18 includes cargo floor 22. A trim member 26 is disposed on the vehicle body 14 and the cargo space 18. The trim member 26 defines an opening 30. A housing 34 is disposed within the opening 30. A light source 38 is disposed on the housing 34. A first lens 42 is disposed adjacent to the light source 38. The first lens 42 defines a first optic 46. A second lens 50 is spaced-apart the first lens 42. The second lens 50 defines a second optic 54. The light source 38 is configured to emit light 58 through the first and second lenses 42, 50 into the cargo space 18.

Referring to FIG. 1, the cargo space 18 is illustrated in a vehicle-rearward portion 62 of an interior cabin 66 of the vehicle 10. Stated differently, the vehicle body 14 defines the cargo space 18 therein. The cargo space 18 may be accessed through a rear door 70. The rear door 70 is operable between an opened and a closed position. When the rear door 70 is in the opened position, a user may access the cargo space 18 of the vehicle 10. The rear door 70 may be configured as a cargo hatch that vertically moves between the opened and closed positions. Alternatively, the rear door 70 may rotate about a laterally positioned hinge assembly. The vehicle 10 is a wheeled motor vehicle 10, which may be, for example, a sedan, a sport utility vehicle, a truck, a van, a crossover, or other styles of vehicle 10. The vehicle 10 may be manually operated vehicle 10 (e.g. with human driver), a fully autonomous vehicle 10 (e.g., human driver), or a partially autonomous vehicle 10 (e.g., may be operated with or without a human driver). Additionally, the vehicle 10 may be utilized for personal and/or commercial purposes, such as ride-providing services (e.g., chauffeuring) and/or ride-sharing services.

Figure 2:
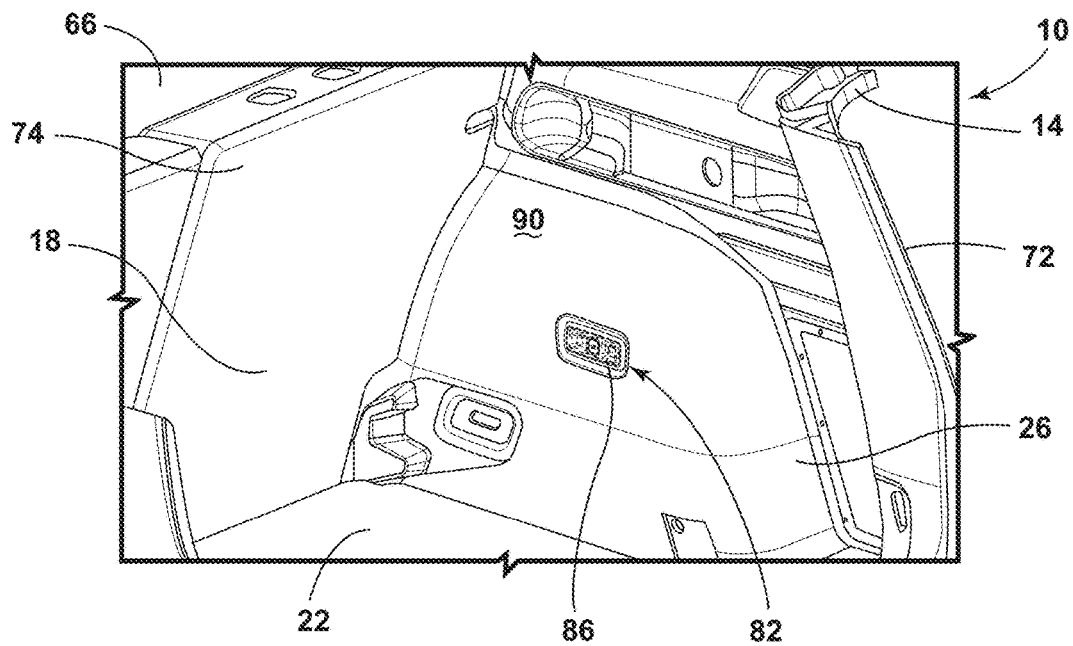
FIG. 2 is a partial side perspective view of a trim panel in a cargo space of a vehicle, according to one example.

Referring to FIGS. 1 and 2, the trim member 26 may be disposed on the vehicle body 14. As illustrated, the trim member 26 may be configured as a side panel within the cargo space 18. The trim member 26 may extend from proximate an access opening 72 to the cargo space 18 to proximate an adjacent seating row 74. In various examples, the trim member 26 may include plastic materials. The trim member 26 may be advantageous to increase aesthetics of the cargo space 18.

The trim member 26 may define the opening 30 in a lower portion 78 thereof. Additionally or alternatively, the opening 30 may be spaced-apart from the cargo floor 22 of the cargo space 18. A lamp assembly 82 may be disposed in the opening 30 defined by the trim member 26. According to various aspects, a size and/or shape of the opening 30 may correspond with the size and/or shape of the lamp assembly 82 disposed therein. The trim member 26 and the lamp assembly 82 may form a substantially continuous surface, such that the lamp assembly 82 may be integrated with the trim member 26. Alternatively, the trim member 26 may define a depression 86 proximate to the opening 30. Stated differently, the opening 30 for the lamp assembly 82 may be disposed within the depression 86 defined by the trim member 26. In this way, the lamp assembly 82 may be offset from a trim surface 90 of the trim member 26. The trim surface 90 may be an A-surface of the trim member 26. As used herein, the term "A-surface" refers to a surface of any component within the vehicle 10 that is visible or contactable by an occupant or passenger of the vehicle 10 when the component is in an assembled state. Contrastingly, the term "B-surface" refers to a surface of any component within the vehicle 10 that is concealed and/or non-contactable by an occupant or passenger of the vehicle 10 when the component is in an assembled state. As such, according to various aspects, the lamp assembly 82 may be set back from the A-surface (e.g., the trim surface 90) of the trim member 26.

Figure 3:
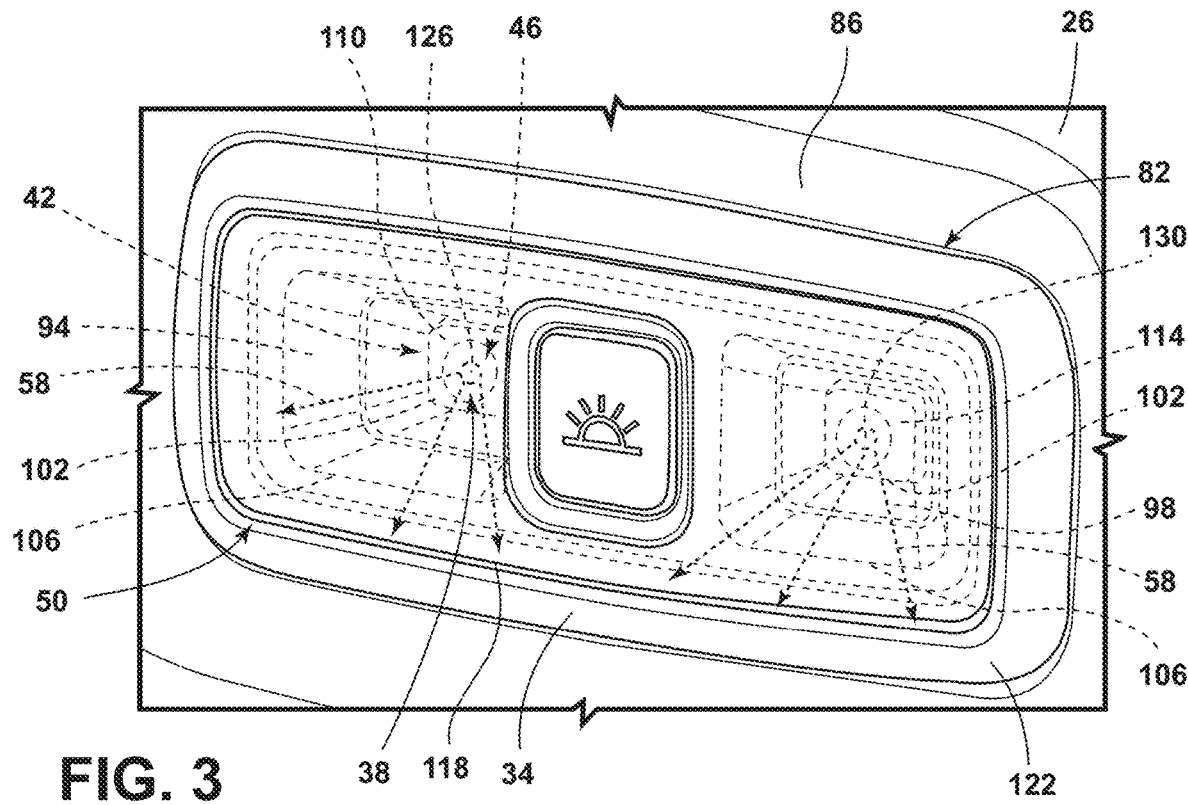
FIG. 3 is a front perspective view of a lamp assembly for a cargo space, according to one example.

Referring to FIG. 3, the lamp assembly 82 includes the housing 34 disposed within the opening 30 (FIG. 1) defined by the trim member 26. As illustrated in FIG. 3, the housing 34 is a substantially rectangular shape. However, the housing 34, and accordingly, the lamp assembly 82, may be circular, oblong, square, or any other practicable size and/or shape without departing from the teachings herein. In various examples, the housing 34 may define a first recess 94 and a second recess 98. The first and second recesses 94, 98 may be substantially similar or, alternatively, may be different sizes and/or shapes depending on the selected configuration of the lamp assembly 82. As illustrated in FIG. 3, each of the first and second recesses 94, 98 has a substantially rectangular shape. However, the shape of the first and second recesses 94, 98 may differ based on the selected direction of light 58 (FIG. 5) emitted from the light source 38 of the lamp assembly 82. Additionally or alternatively, a height and/or a width of each of the first and second recesses 94, 98 may increase between a rear edge 102 of the first and second recesses 94, 98 and a front edge 106, respectively. Stated differently, the first and second recesses 94, 98 may have increased sizes proximate the second lens 50 relative to proximate the first lens 42.

Still referring to FIG. 3, the lamp assembly 82 may include the first lens 42 and the second lens 50. The first lens 42 may be configured as first and second inner lenses 110, 114 and the second lens 50 may be configured as an outer lens 118. The first and second inner lenses 110, 114 may be disposed within the first and second recesses 94, 98, respectively. In various examples, the first and second inner lenses 110, 114 may be disposed proximate the rear edges 102 of the first and second recesses 94, 98, respectively. In this way, the first and second inner lenses 110, 114 may be spaced-apart from one another. Additionally or alternatively, the first and second inner lenses 110, 114 may also be horizontally aligned with one another. However, other configurations of the first and second lenses 42, 50 based on the selected configuration of the lamp assembly 82 are contemplated without departing from the teachings herein.

According to various aspects, the first and second inner lenses 110, 114 may be spaced-apart from the outer lens 118. While the first and second inner lenses 110, 114 may be disposed proximate the rear edges 102 of the first and second recesses 94, 98. The outer lens 118 may be disposed proximate the front edges 106 of the first and second recesses 94, 98. Stated differently, the first and second recesses 94, 98 may extend between the outer lens 118 and the first and second inner lenses 110, 114, respectively.

In various examples, the outer lens 118 may extend over both of the first and second recesses 94, 98, and, accordingly, the first and second inner lenses 110, 114. In various examples, the housing 34 may include a peripheral rim 122. The outer lens 118 may be positioned within the peripheral rim 122 of the housing 34. Alternatively, the outer lens 118 may be disposed over and coupled to the peripheral rim 122.

The lamp assembly 82 may also include the light source 38. In various examples, the light source 38 may include a first light source 126 and a second light source 130. The first and second light sources 126, 130 may be disposed proximate the first and second inner lenses 110, 114, respectively. Each of the first and second light sources 126, 130 may be a single light source 38 or, alternatively, may be a plurality of light sources. The first and second light sources 126, 130 may include any form of light source 38. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lamp assembly 82. Further, various types of LEDs are suitable for use as the light sources 126, 130 including, but not limited to, top-emitting LEDs, side-emitting LEDs, and others. Moreover, according to various examples, multicolored light sources such as Red, Green, and Blue (RGB) LEDs that employ red, green, and blue LED packaging may be used to generate various desired colors of light 58 outputs from a single light source 38, according to known light 58 color mixing techniques. Additionally or alternatively, a variable current may be supplied to the light sources 126, 130 to adjust the degree of illumination emitted therefrom. Any light source 38 disposed within the lamp assembly 82 may illuminate in a plurality of colored and/or hues based on the wavelength emitted from the light source 38 and/or the intensity of light 58 emitted therefrom. The first and second light sources 126, 130 may be configured to emit light 58 through the first and second inner lenses 110, 114, respectively, and the outer lens 118.

Figure 4:
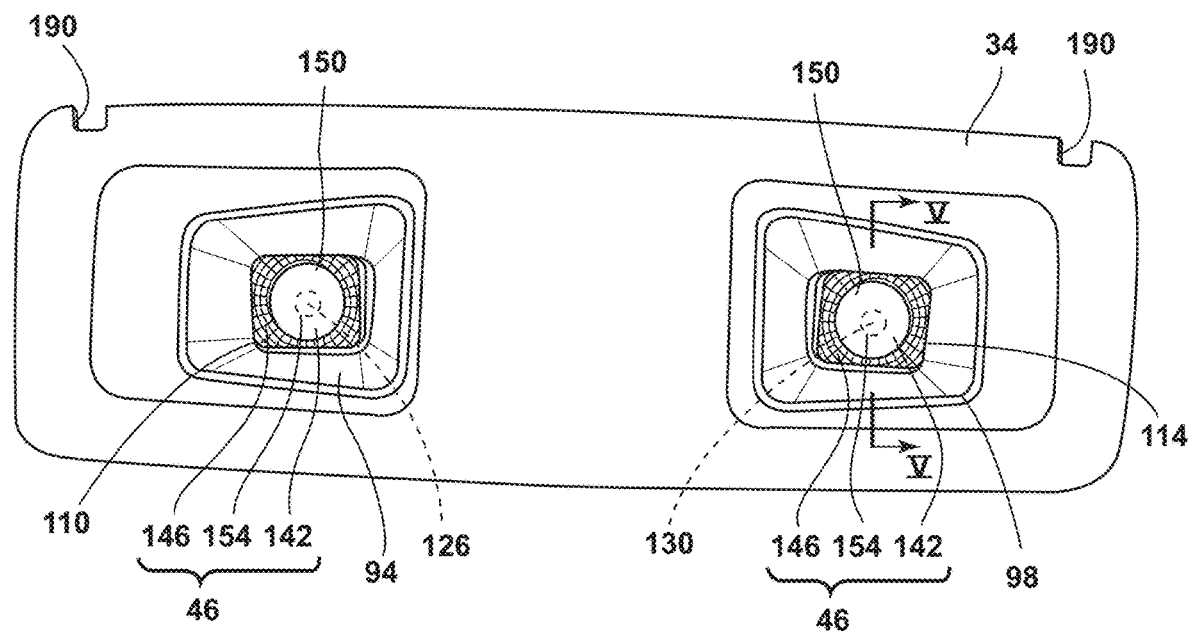
FIG. 4 is a front plan view of a housing with first and second inner lenses, according to one example.

Referring to FIG. 4, the housing 34 of the lamp assembly 82 with the first and second inner lenses 110, 114 is illustrated. The first and second recesses 94, 98, as illustrated in FIG. 4, may be asymmetrical. In such examples, the first and second recesses 94, 98 may be substantially mirror images of one another. For example, as a non-limiting example, each of the first and second recesses 94, 98 may have a greater inner height compared to an outer height. Alternatively, each of the first and second recesses 94, 98 may be symmetrical. The selected configuration of the recesses and the first and second inner lenses 110, 114 relative to the first and second recesses 94, 98, respectively, may be advantageous for directing the light 58 (FIG. 5) emitted from the first and second light sources 126, 130 to a selected location on the cargo floor 22 (FIG. 1).

Figure 5:
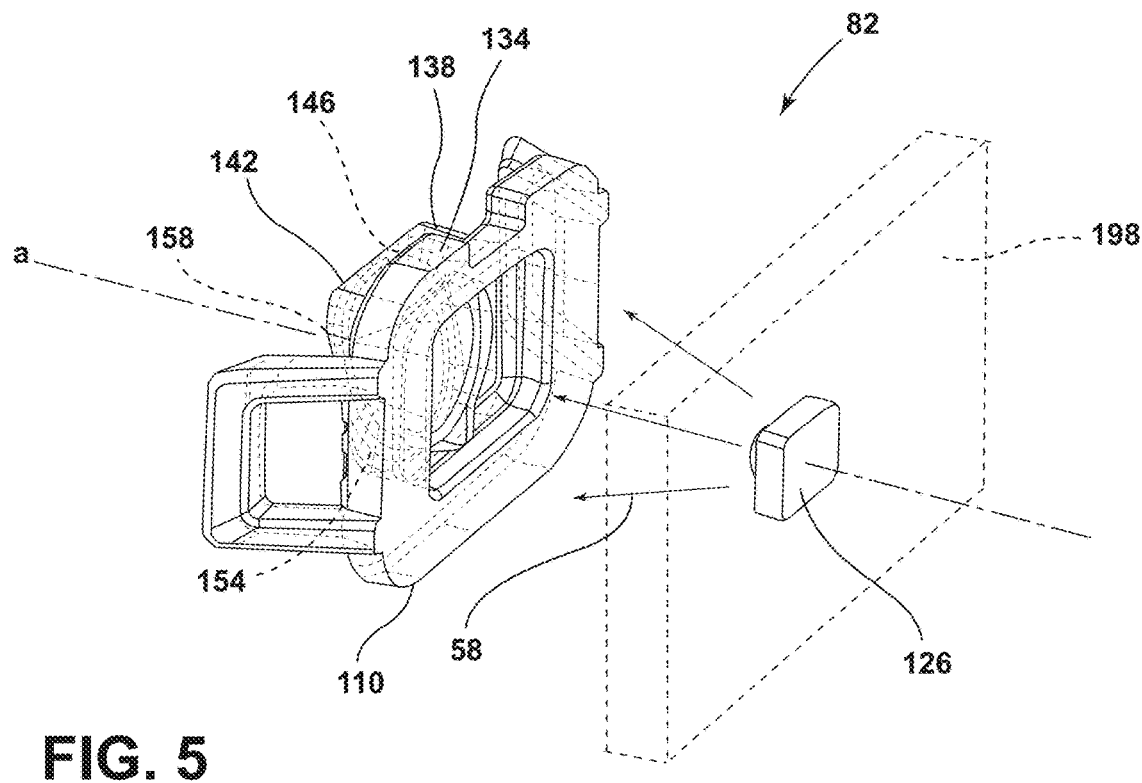
FIG. 5 is a side perspective view of an inner lens of a lamp assembly, according to one example.

Referring to FIGS. 4 and 5, the first and second inner lenses 110, 114 may have substantially similar configurations. The first and second inner lenses 110, 114 may each include a support member 134 and a base portion 138 extending from the support member 134. Each of the first and second inner lenses 110, 114 may include a first inner optic 142 and a second inner optic 146. Stated differently, the first optic 46 may include the first and second inner optics 142, 146. The base portion 138 may integrally define both the first and second optics 54. However, it is also contemplated that the first and second inner optics 142, 146 may be defined by the support member 134 of the first and second inner lenses 110, 114. In various examples, the first and second inner optics 142, 146 may be integrally defined by the base portions 138 of each of the first and second inner lenses 110, 114, respectively. The first inner optics 142 may be configured as a central optic disposed in a center portion 150 of each of the first and second inner lenses 110, 114. Additionally or alternatively, each of the first inner optics 142 may be an aspherical portion 154 disposed centrally in each of the first and second inner lenses 110, 114.

In various examples, the aspherical portions 154 may extend outward and away from the support members 134. The aspherical portions 154 may be configured as a substantially hemi-spherical shape. Stated differently, the aspherical portions 154 may form convex structures relative to the support members 134, respectively. The aspherical portions 154 may be advantageous for collimating the light 58 emitted from the first and second light sources 126, 130, respectively. In this way, the aspherical portions 154 of the first and second inner lenses 110, 114 can maximize the efficiency of the first and second light sources 126, 130. Further, the aspherical portions 154 may be advantageous for collecting and/or directing the emitted light 58 from the first and second light sources 126, 130, respectively.

According to various aspects, the aspherical portions 154 of the first and second inner lenses 110, 114 may be disposed adjacent to the first and second light sources 126, 130. In various examples, an apex 158 of each of the aspherical portions 154 may align with a central axis a of the first and second light sources 126, 130, respectively. The central axis a may be a longitudinal line extending between an exterior of the first and second light sources 126, 130, respectively, and the housing 34. In a non-limiting example where the first and second light sources 126, 130 are spherical, the central axis a may be parallel to a line extending between apexes 158 of the first and second light sources 126, 130 and the housing 34. As illustrated in FIG. 5, the central axes a of the first and second light sources 126, 130 are substantially horizontal axes.

Referring still to FIGS. 4 and 5, the apexes 158 of the aspherical portions 154 may be horizontally aligned with the first and second light sources 126, 130. Alternatively, the axes of the aspherical portions 154 may be offset from the central axes a of the first and second light sources 126, 130. In such examples, the apexes 158 may be below the central axis a. This configuration may be advantageous for directing the emitted light 58 from the first and second light sources 126, 130 downward toward the cargo floor 22 (FIG. 1). Additionally or alternatively, the apexes 158 may be disposed to a side of the central axes a (e.g., the left side or right side). This configuration may be advantageous for directing the emitted light 58 from the first and second light sources 126, 130 laterally within the cargo space 18 (FIG. 1). The apexes 158 of the aspherical portions 154 of the first and second inner lenses 110, 114 may be oriented similarly, relative to the central axes of the first and second light sources 126, 130, or alternatively, may be oriented differently based on the selected configuration of the emitted light 58 from the lamp assembly 82. The aspherical portions 154 may be adjusted to direct the emitted light 58 to selected locations on the cargo floor 22 and/or within the cargo space 18 (FIG. 1).

Figure 6:
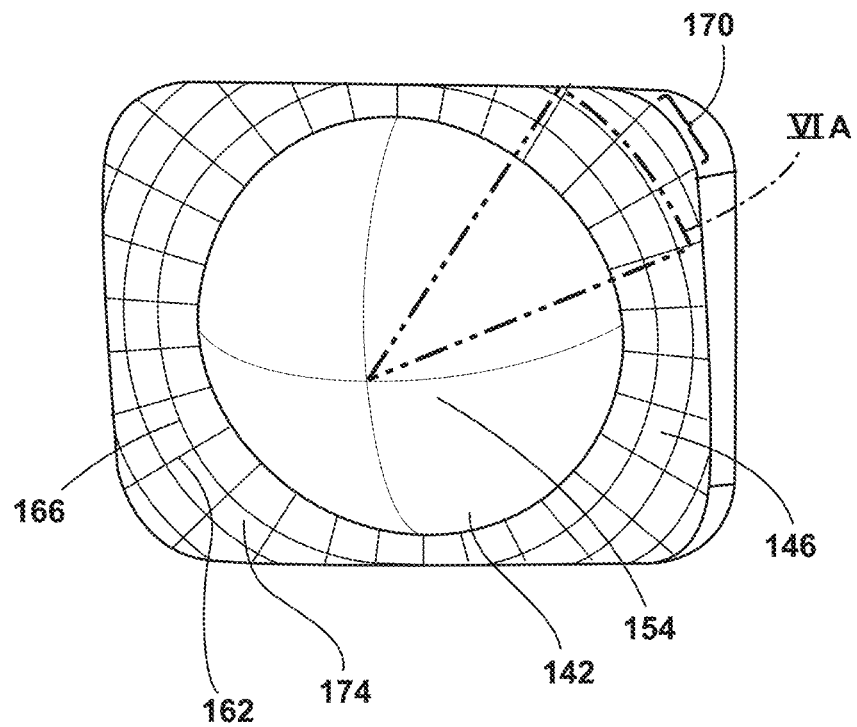
FIG. 6 is a front perspective view of the inner lens of FIG. 4.

Referring to FIGS. 4 and 6, each of the first and second inner lenses 110, 114 may include the second inner optic 146. The second inner optics 146 may be configured as radial optics surrounding the first inner optic 142. Stated differently, the second inner optic 146 may extend around the aspherical portions 154 of the first inner optics 142. The second inner optics 146 may include a plurality of radially extending ridges 162 defining radially extending ridges 162 and a plurality of concentric ridges 166. The plurality of radially extending ridges 162 may extend outward from the aspherical portions 154 (e.g., the first inner optic 142). In this way, the plurality of radially extending ridges 162 may extend between the aspherical portion 154 and an outer edge of each of the base portions 138 of the first and second inner lenses 110, 114. The aspherical portions 154 may be configured as a central location from which the radially extending ridges 162 extend. The radially extending ridges 162 may define a plurality of radially extending channels 170 therebetween.

Referring still to FIGS. 4 and 6, additionally or alternatively, a plurality of concentric ridges 166 may extend around the aspherical portion 154. As used herein, "concentric" means the plurality of concentric ridges 166 arranged coaxially, such that the plurality of concentric ridges 166 share a same central point. In various examples, the plurality of concentric ridges 166 defines a plurality of concentric grooves 174 between adjacent concentric ridges 166. In this way, adjacent radially extending ridges 162 may define a single radially extending channel and adjacent concentric ridges 166 may define a single concentric groove 174. The plurality of radially extending channels 170 may intersect with the plurality of concentric grooves 174.

Figure 6A:
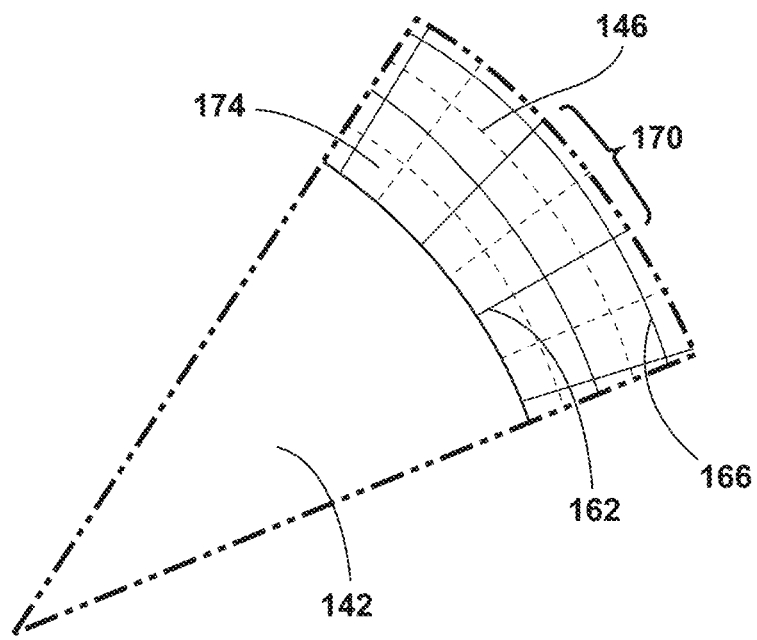
FIG. 6A is a partial top plan view of the first inner lens of FIG. 6, taken at area VIA.

Referring to FIGS. 6 and 6A, according to various aspects, light 58 (FIG. 5) emitted by the first and second light sources 126, 130 (FIG. 4) may strike the plurality of radially extending ridges 162 and/or the plurality of concentric ridges 166 at incident angles of about 0°, such that the light 58 passes through the first and second inner lenses 110, 114 without substantial diversion. The incident angle of about 0° may occur at a summit or peak of each ridge of the plurality of radially extending ridges 162 and the plurality of concentric ridges 166. The plurality of radially extending channels 170 and the plurality of concentric ridges 166 may include sloping surfaces between each of the adjacent radially extending ridges 162 and adjacent concentric ridges 166, respectively. The incident angle in which the light 58 strikes the plurality of radially extending channels 170 and the plurality of concentric grooves 174 may increase the degree of diversion of the emitted light 58. Additionally or alternatively, it is also contemplated that the incident angle may decrease, which may decrease the diversion of the emitted light 58. According to various aspects, the emitted light 58 that strikes center portions 150 of each of the plurality of radially extending channels 170 and the plurality of concentric grooves 174 may pass through the first and second inner lenses 110, 114 without substantial diversion, similar to the peaks or summits of the plurality of radially extending ridges 162 and the plurality of concentric ridges 166. This configuration of the second inner optics 146 may further collimate the emitted light 58 from the first and second light sources 126, 130. Further, this configuration may blend the emitted light 58, such that a uniform beam pattern may be emitted through the first and second inner lenses 110, 114.

Each of the first and second inner lenses 110, 114 may include the first inner optic 142 and the second inner optic 146. The first inner optic 142 may be defined as a centrally located aspherical portion 154 and the second inner optic 146 may be defined as a border portion. The combination of the first and second inner optics 142, 146 may define a spider web-like combination of optics on the first and second inner lenses 110, 114. Additionally or alternatively, each of the radially extended ridges and the concentric ridges 166 may have a curved outer surface. The outer surface may be curved in a first direction between two adjacent grooves 174 or channels 170, respectively, with the peak or summit being disposed at a center portion 150 of the ridges. The first direction may be a same or, alternatively, an opposing direction relative to the aspherical portions 154 of the first inner optics 142. However, it is also contemplated that each radially extending and/or concentric ridge or, alternatively, some of the radially extending and/or concentric ridges 166 may be curved in a second direction. The plurality of concentric grooves 174 may circumferentially extend around the aspherical portion 154. This configuration may contribute to the spider web-like pattern of the first and second inner optics 142, 146.

Figure 7:
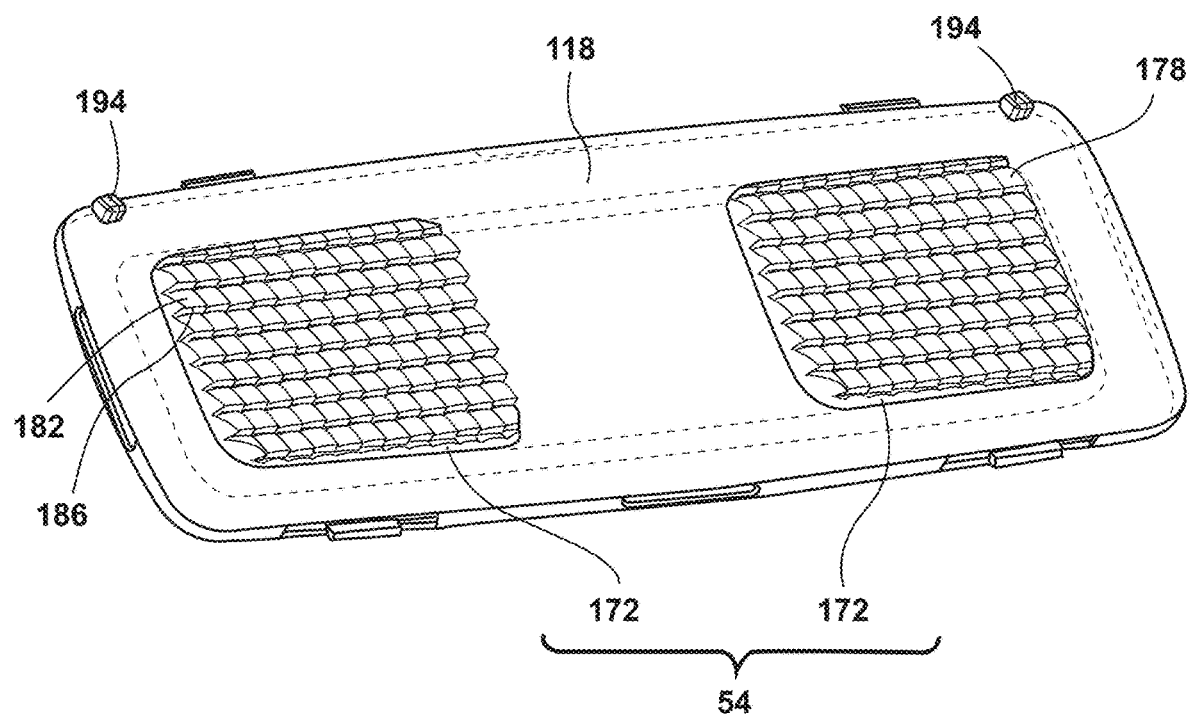
FIG. 7 is a top perspective view of an outer lens with an outer optic, according to at least one example.

Referring to FIG. 7, the outer lens 118 may define the outer optic 172. Stated differently, the second optic 54 may include and/or be configured as the outer optic 172. The outer optic 172 may define at least one of a prism optic and a pillow optic. Additionally or alternatively, in various examples, the outer optic 172 may be a combination of a prism optic and a pillow optic. Stated differently, each optic member 178 of the second optic 54 may be a combination of the prism optic and the pillow optic. In this way, an upper surface 182 of each of the optic members 178 of the outer optic 172 may be curved. The curved upper surface 182 may be similar to the pillow optic. In the configuration best illustrated in FIG. 1, the curved upper surface 182 of the outer optic 172 may disperse the emitted light 58 in vehicle-rearward and vehicle-forward directions in the cargo space 18. The curved upper surface 182 of each of the optic members 178 may be advantageous for laterally dispersing the emitted light 58 from the first and second light sources 126, 130. Referring again to FIG. 7, additionally or alternatively, each of the optic members 178 of the outer optic 172 may have a planar lower surface 186. The planar lower surface 186 may be similar to the prism optic. The planar lower surface 186 may be advantageous for directing and/or bending the emitted light 58 (FIG. 5) downward. In the configuration illustrated in FIG. 1, the planar lower surface 186 may direct the emitted light 58 toward the cargo floor 22. In this way, the outer optic 172 may be configured to direct and disperse light 58 in selected directions within the cargo space 18.

Figure 8:
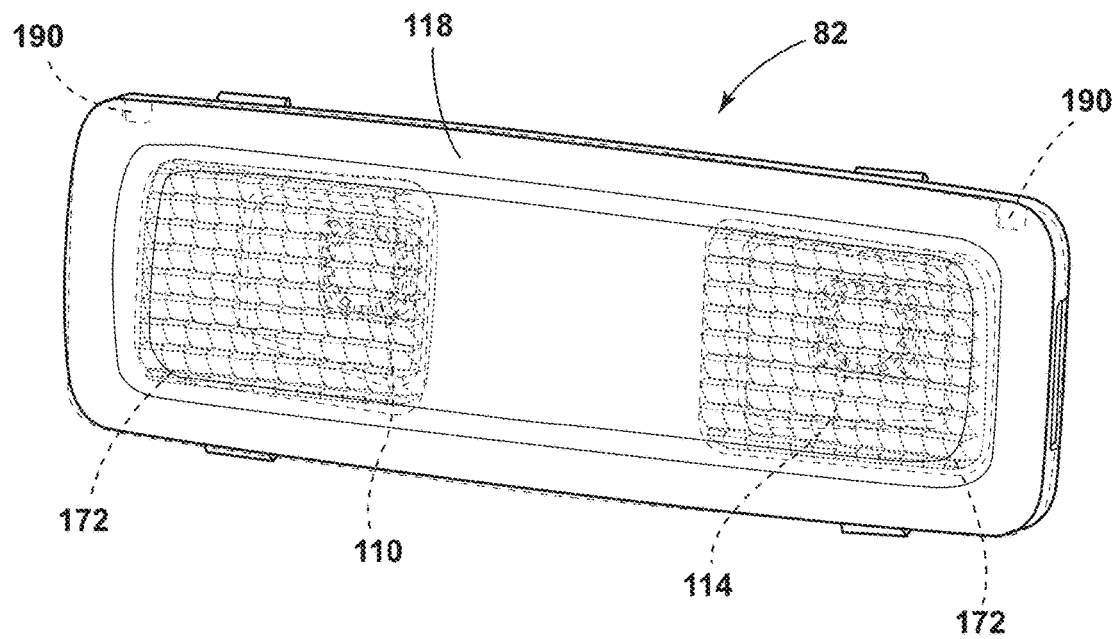
FIG. 8 is a front perspective view of a lamp assembly, according to at least one example.

As illustrated in FIGS. 4, 7, and 8, the outer lens 118 may define the outer optic 172 in discrete portions of the outer lens 118. As illustrated best in FIG. 8, the discrete portions of the outer optic 172 substantially align with the first and second recesses 94, 98 of the housing 34. In this way, the first and second light sources 126, 130 may be configured to emit light 58 toward the discrete portions of the outer optic 172.

The outer lens 118 may be coupled to the housing 34. The housing 34 may define notches 190 configured to receive protrusions 194 extending from the outer lens 118. In this way, the outer lens 118 may be secured to the housing 34.

This configuration may be advantageous for substantially consistent light 58 dispersion from the first and second inner optics 142, 146 and the outer optic 172. Additionally or alternatively, securing the outer lens 118 to the housing 34 may retain the alignment between the discrete portions of the outer optic 172 with the first and second inner lenses 110, 114.

Figure 9:
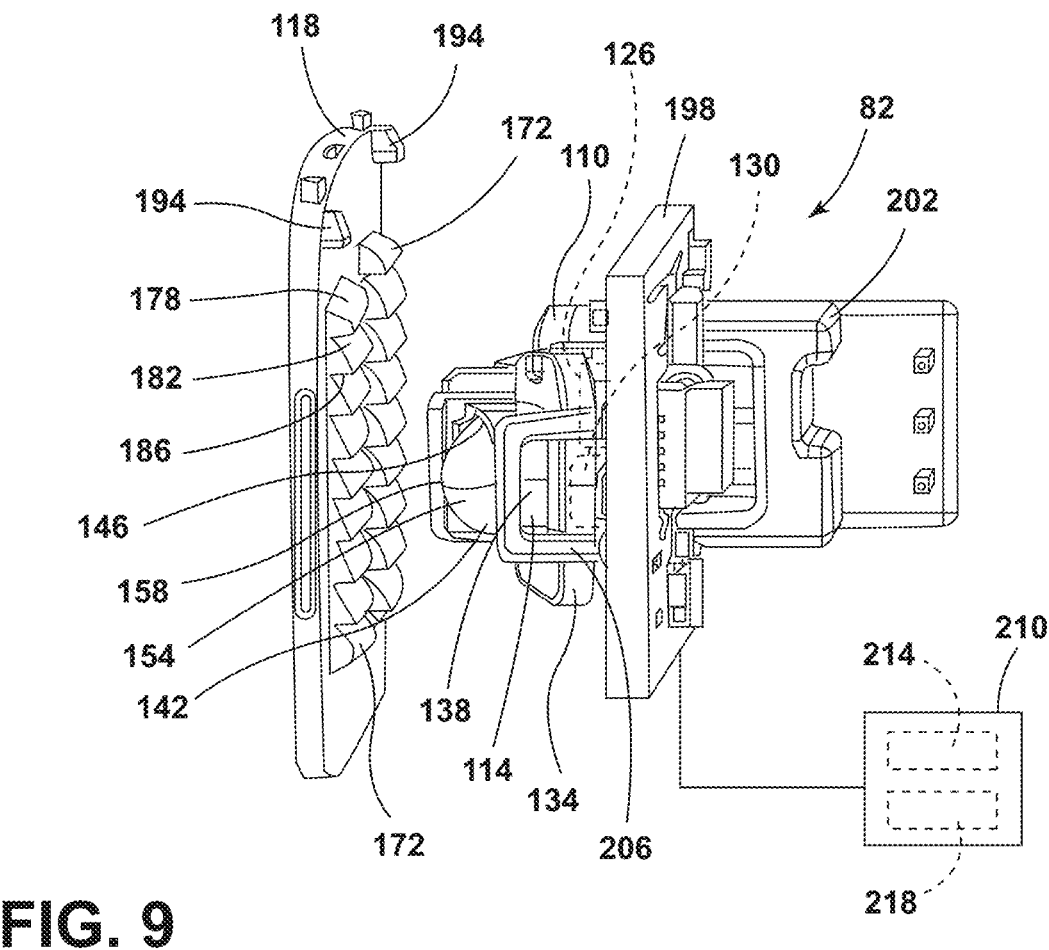
FIG. 9 is a side perspective view of a lamp assembly with a housing removed, according to at least one example.

Referring to FIG. 9, the first and second light sources 126, 130 in FIG. 9 may be disposed on one or more circuits 198. The one or more circuits 198 may be configured as a flexible circuit board or rigid circuit board. Additionally or alternatively, the one or more circuits 198 may be configured as a printed circuit board. The one or more circuits 198 may be coupled to a connector 202. The connector 202 may be coupled to the one or more circuits 198 on an opposing side relative to the first and second light sources 126, 130. The connector 202 may couple the lamp assembly 82 to the vehicle 10 (FIG. 1). The first and second inner lenses 110, 114 may be disposed adjacent to and/or over the first and second light sources 126, 130. In this way, the first and second inner lenses 110, 114 may also be coupled to the one or more circuits 198 or, alternatively, may be spaced-apart from the one or more circuits 198.

In various examples, the first and second inner lenses 110, 114 may include coupling members 206 extending from the support members 134 for coupling the first and second inner lenses 110, 114 to the one or more circuits 198. The first and second inner lenses 110, 114, as illustrated in FIG. 9, may be angled outward relative to one another. However, it is also contemplated that the first and second inner lenses 110, 114 may be oriented in a similar direction, towards one another, or in separate directions.

The outer lens 118 may be disposed adjacent to and spaced-apart from the first and second inner lenses 110, 114. In various examples, the outer lens 118 may define the outer optic 172 on the B-surface of the outer lens 118. In this way, the outer lens 118 may have a substantially planar A-surface visible to the passenger or occupant of the vehicle 10, but may still provide for the selected diversion of the emitted light 58. Moreover, it is also contemplated that the first and second inner lenses 110, 114 and the outer lens 118 may be textured to further mix and blend the emitted light 58 (FIG. 5) from the first and second light sources 126, 130.

In various examples, the first and second light sources 126, 130 may be operably coupled to a controller 210. The controller 210 may include a processor 214, a memory 218, and other control circuitry. Commands or routines may be stored in the memory 218 and executable by the processor 214. The routines may include one or more algorithms relating to activation of the first and second light sources 126, 130. According to various aspects, the first and second light sources 126, 130 may be selectively and/or independently activated by the controller 210. In a non-limiting example, the controller 210 may automatically activate at least one of the first and second light sources 126, 130 when the rear door 70 (FIG. 1) is opened. Additionally or alternatively, the first and second light sources 126, 130 may be activated by the controller 210 in response to a command from a user-interface. Moreover, the controller 210 may selectively and/or independently deactivate the first and second light sources 126, 130 in a similar manner.

Referring to FIGS. 1-9, in operation, the controller 210 may activate one or both of the first and second light sources 126, 130. The first and second light sources 126, 130 may emit light 58 towards the first and second inner optics 142, 146 of the first and second inner lenses 110, 114. The first inner optics 142 may operate to collimate the emitted light 58 from the first and second light sources 126, 130. The second inner optics 142, 146 may further collimate the light 58 emitted from the first and second light sources 126, 130. Additionally, the second inner optics 146 may blend the emitted light 58 to produce a more uniform light 58 beam. The outer optic 172 may operate to direct the emitted light 58 in a selected direction within the cargo space 18. For example, the curved upper surfaces 182 of the optic members 178 of the outer optic 172 may laterally disperse the emitted light 58 in the vehicle-forward and the vehicle-rearward directions of the cargo space 18. Additionally or alternatively, the planar lower surfaces 186 of the optic members 178 of the outer optic 172 may direct the emitted light 58 downward towards the cargo floor 22. In this way, the lamp assembly 82 may direct (e.g., bend) the emitted light 58 downward and disperse the emitted light 58 outward. This configuration may be advantageous for lighting the cargo space 18 while minimizing glare and/or misdirected emitted light 58, which may interfere with passengers and/or occupants of the vehicle 10. Further, the lamp assembly 82 may minimize the emitted light 58 directed upward, which may cause a glare effect to a person located exterior of the vehicle 10 proximate to the access opening 72.

Use of the presently disclosed device may provide for a variety of advantages. For example, the first and second light sources 126, 130 may illuminate the cargo space 18 between about 3 lux and about 50 lux. Additionally, use of the inner first and second inner lenses 110, 114 and the outer lens 118 may reduce glare from the lamp assembly 82. In this way, the lamp assembly 82 may reduce the amount of the emitted light 58 directed towards the access opening 72 of the cargo space 18 and/or upwards, away from the cargo floor 22. This configuration may reduce and/or eliminate a glare effect caused by emitted light 58 being directed upwards. As such, the lamp assembly 82 may reduce and/or eliminate a glare effect that may be experienced by a person located exterior to the vehicle 14 proximate to the access opening 72. Moreover, the first and second inner lenses 110, 114 and the outer lens 118 may increase efficiency of the lamp assembly 82. In this way, a single lamp assembly 82 may be used to illuminate the cargo space 18. However, it is also contemplated that one or more lamp assemblies may be used in the cargo space 18 and/or additional locations within the vehicle 10 without departing from the teachings herein. Further, the first and second inner optics 142, 146 and the outer optic 172 may increase uniformity in luminescence within the cargo space 18. Additionally, the lamp assembly 82, disclosed herein, may improve the aesthetics of the cargo space 18. Additional benefits or advantages of using this device may be realized and/or achieved.

According to various examples, a vehicle includes a vehicle body that defines a cargo space. The cargo space includes a cargo floor. A trim member is disposed on the vehicle body within the cargo space. The trim member defines an opening. The housing is disposed within the opening. A light source is disposed on the housing. A first lens is disposed adjacent to the light source. The first lens defines a first optic. A second lens is spaced-apart from the first lens. The second lens defines a second optic. The light source is configured to emit light through the first lens and the second lens into the cargo space. Embodiments of the present disclosure may include one or a combination of the following features:

at least one first optic includes a central optic and a radial optic surrounding the central optic;

a radial optic includes a plurality of radially extending ridges that define channels and a plurality of concentric ridges that define concentric groups;

at least one first optic includes an aspherical portion aligned with at least one light source;

at least one first optic includes a radial optic surrounding an aspherical portion. The radial optic includes radially extending ridges and concentric ridges;

a second optic defines at least one of a prism optic and a pillow optic;

each optic member of the day second optic includes a curved surface and a planar surface configured to direct admitted light from at least one light source towards a cargo floor;

a second optic is configured to direct emitted light towards a cargo floor. The second optic is configured to disperse the emitted light laterally; and a second lens defines a second optic and a B-surface of a second lens.

According to another aspect of the present disclosure, a vehicle cargo lamp assembly includes a circuit board and first and second light sources disposed on the circuit board and spaced-apart from one another. A first inner lens is disposed proximate the first light source. The first inner lens defines a first inner optic and a second inner optic. A second inner lens is disposed proximate the second light source. The second inner lens defines the first inner optic and the second inner optic. An outer lens is disposed proximate the first and second inner lenses. The outer lens defines an outer optic. Embodiments of the present disclosure may include one or a combination of the following features:

each first inner optic is an aspherical portion disposed centrally in each of first and second inner lenses, respectively;

each second inner optic defines a plurality of ridges that extends radially from an aspherical portion and a second plurality of ridges that extends concentrically around the aspherical portions, respectively;

a housing defines a first recess and a second recess. First and second inner lenses are disposed within the first and second recesses, respectively;

an outer lens defines an outer optic and discrete portions thereof that align with first and second inner lenses, respectively; and a second inner optic defines a plurality of radially that extends channels and a plurality of concentric grooves. The plurality of concentric grooves intersect the plurality of radially extending channels.

According to various examples, a cargo lamp assembly includes a circuit board and a light source disposed on the circuit board. An inner lens is disposed adjacent to the light source. The inner lens defines a first inner optic and a second dinner optic. An outer lens is disposed adjacent to the inner lens. The outer lens defines an outer optic. The light source emits light through the first and second inner lenses and the outer lens when the light source is activated. Embodiments of the present disclosure may include one or a combination of the following features:

a first inner optic is an aspherical portion. A second inner optic is a plurality of radially that extends ridges and a plurality of concentric ridges;

an apex of an aspherical portion is offset from a central axis of a light source;

a first inner optic is defined in a center portion of an inner lens. A second inner optic is defined on a border portion of the inner lens; and an outer optic is defined on a B-surface of an outer lens. Each optic member of the outer optic includes a curved upper surface and a planar lower surface.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
a vehicle body defining a cargo space, wherein the cargo space includes a cargo floor;
a trim member disposed on the vehicle body within the cargo space, wherein the trim member defines an opening;
a housing disposed within the opening;
at least one light source disposed on the housing;
at least one first lens disposed adjacent to the at least one light source, wherein the at least one first lens defines at least one first optic; and
a second lens spaced-apart from the at least one first lens, wherein the second lens defines a second optic that includes a plurality of optic members, wherein the at least one light source is configured to emit light through the at least one first lens and the second lens into the cargo space, and wherein each optic member of the second optic includes a curved surface and a planar surface configured to direct emitted light from the at least one light source toward the cargo floor.

2. The vehicle of claim 1, wherein the at least one first optic includes a central optic and a radial optic surrounding the central optic.

3. The vehicle of claim 2, wherein the radial optic includes a plurality of radially extending ridges defining radially extending channels and a plurality of concentric ridges defining concentric grooves.

4. The vehicle of claim 1, wherein the at least one first optic includes an aspherical portion aligned with the at least one light source.

5. The vehicle of claim 4, wherein the at least one first optic includes a radial optic surrounding the aspherical portion, wherein the radial optic includes radially extending ridges and concentric ridges.

6. The vehicle of claim 1, wherein the second optic is configured to direct emitted light toward the cargo floor, and wherein the second optic is configured to disperse the emitted light laterally.

7. The vehicle of claim 1, wherein the second lens defines the second optic on a B-surface of the second lens.

8. A vehicle cargo lamp assembly, comprising:
a circuit board;
first and second light sources disposed on the circuit board and spaced-apart from one another;
a first inner lens disposed proximate the first light source, wherein the first inner lens defines a first inner optic and a second inner optic;
a second inner lens disposed proximate the second light source, wherein the second inner lens defines a first inner optic and a second inner optic; and
an outer lens disposed proximate the first and second inner lenses, wherein the outer lens defines an outer optic, wherein the outer lens defines the outer optic on discrete portions thereof that align with the first and second inner lenses, respectively.

9. The vehicle cargo lamp assembly of claim 8, wherein each of the first inner optics is an aspherical portion disposed centrally in each of the first and second inner lenses, respectively.

10. The vehicle cargo lamp assembly of claim 9, wherein each of the second inner optics defines a first plurality of ridges extending radially from the aspherical portions and a second plurality of ridges extending concentrically around the aspherical portions, respectively.

11. The vehicle cargo lamp assembly of claim 8, further comprising:
a housing defining a first recess and a second recess, and wherein the first and second inner lenses are disposed within the first and second recesses, respectively.

12. The vehicle cargo lamp assembly of claim 8, wherein each of the second inner optics defines a plurality of radially extending channels and a plurality of concentric grooves, wherein the plurality of concentric grooves intersect the plurality of radially extending channels.

13. A cargo lamp assembly, comprising:
a circuit board;
a light source disposed on the circuit board;
an inner lens disposed adjacent to the light source, wherein the inner lens defines a first inner optic and a second inner optic, and wherein the first inner optic is an aspherical portion and the second inner optic is a plurality of radially extending ridges and a plurality of concentric ridges; and
an outer lens disposed adjacent to the inner lens, wherein the outer lens defines an outer optic, and wherein the light source emits light through the inner lens and the outer lens when the light source is activated.

14. The cargo lamp assembly of claim 13, wherein an apex of the aspherical portion is offset from a central axis of the light source.

15. The cargo lamp assembly of claim 13, wherein the first inner optic is defined in a center portion of the inner lens, and wherein the second inner optic is defined on a border portion of the inner lens.

16. The cargo lamp assembly of claim 13, wherein the outer optic is defined on a B-surface of the outer lens, wherein the outer optic includes a plurality of optic members, and wherein each optic member of the outer optic includes a curved upper surface and a planar lower surface.

* * * * *